Patented Dec. 14, 1948

2,455,912

UNITED STATES PATENT OFFICE 2,455,912

POLYMERIZED TETRAMETHYLETHYLENE OXIDE

Theodore L. Cairns and Robert M. Joyce, Jr., Wilmington, Del., assignors to E. I. du Pont de Nemours & Company, Wilmington, Del., a corporation of Delaware No Drawing. Application August 11, 1947, Serial No. 768,086

1 Claim. (Cl. 260—2)

This invention relates to synthetic organic polymers, and more particularly to polytetramethylethylene oxide.

It is known that alkylene oxides, including those having four or more carbon atoms, can be polymerized by various metal halide catalysts, such as aluminum chloride, stannic chloride, and boron trifluoride (British Patent 582,266). All the aliphatic alkylene monoxide polymers hitherto known and described are liquids or waxy solids which do not have melting points substantially in excess of 150° C. Furthermore, in the case of isobutylene oxide, which is the only alkylene oxide described in the mentioned patent of the polymer is obtained with boron trifluoride as the catalyst only at relatively low temperatures. It is also known that carbocyclic epoxy compounds can be polymerized with similar catalysts, but the relatively high softening polymers obtained are soluble in common organic solvents such as toluene and butyl acetate (U. S. Patent 2,054,099), and differ markedly from the present organic insoluble and infusible polymers.

We have now found that the oxide of the completely substituted ethylene, tetramethylethylene, when subjected to polymerization under the influence of a boron fluoride catalyst, gives a solid macromolecular polytetramethylethylene oxide.

In one method of preparing polytetramethylethylene oxide, the monomer is heated under elevated temperature and pressure in a closed vessel with a small amount of anhydrous boron trifluoride for several hours. The polymer, a hard, white, brittle solid, can be recovered from the reaction mixture after removal of catalyst and any unchanged monomer.

The tetramethylethylene oxide used in the preparation of the polytetramethylethylene oxide of this invention can be prepared in accordance with the method described in J. Am. Chem. Soc., 58, 2147 (1936).

The preparation of polytetramethylethylene oxide is specifically illustrated in the following examples:

Example I

To 2.6 g. of tetramethylethylene oxide was added 0.5 cc. of anhydrous boron trifluoride gas from a gas burette. This was about 0.05% by weight of boron trifluoride based on tetramethylethylene oxide. The reaction mixture was heated for 20 hours at 150° C. under a pressure of 7900 atmospheres in a glass container in a pressure apparatus with the pressure being directly transmitted to the reaction mixture by means of mercury. At the end of the 20-hour period the reaction mixture was treated with a small amount of water and the boron trifluoride was neutralized with potassium carbonate. The mixture was boiled and filtered hot, leaving a hard, white, brittle solid from which all but traces of mercury were removed by sublimation of the metal. Analysis of a purified sample showed the following:

Calc'd. for $(C_6H_{12}O)_x$: C, 71.9; H, 12.08; C:H, 5.95; found: C, 70.7, 70.2; H, 11.88, 11.83; C:H, 5.95, 5.93.

In each analysis, the C:H ratio is correct for polytetramethylethylene oxide. The slight lowering of the carbon and hydrogen content was shown to be due to traces of mercury which had not been removed.

Example II

To 2.7 g. of tetramethylethylene oxide in a glass pressure reaction vessel was added 1 cc. of anhydrous boron trifluoride gas from a gas burette. This was about 0.1% by weight of boron trifluoride, based on the tetramethylethylene oxide. The reaction vessel was sealed and heated at 270° C. for 7 hours. At the end of this time the liquid was decanted from the mixture, leaving a small amount of white solid polytetramethylethylene oxide insoluble in hot water and infusible without discoloration at 300° C.

Example III

A mixture of 2 g. of tetramethylethylene oxide in 10 cc. of methylene chloride was cooled to −100° C. and a solution of 0.3 g. of boron fluoride etherate (about 15% by weight based on the tetramethylethylene oxide) in 5 cc. of methylene chloride was added. The mixture set to a gel within 30 seconds. It was stirred for 5 minutes and after dilution with an equal volume of ethanol was allowed to warm to room temperature. The methylene chloride was removed by evaporation on a steam bath and the thin slurry remaining was diluted with water and filtered, leaving a good yield of polytetramethylethylene oxide.

Polytetramethylethylene oxide is a hard, white, brittle solid, infusible at 300° C., with only slight discoloration at that temperature in air. On ignition it burns with a yellow flame, leaving no residue. The polymer is unaffected by boiling 5 minutes or agitating 65 hours at room temperature in xylene, tetrahydrofuran, dimethyl formamide, methyl ethyl ketone, isophorone, dioxane, carbon tetrachloride, diisobutyl adipate, or methanol.

Macromolecular polytetramethylethylene oxide shows an unexpected degree of infusibility at high temperatures, since it is infusible at 300° C. and is relatively heat-stable at this temperature. The polymer can be molded and extruded at somewhat higher temperatures. Polytetramethylethylene oxide is of value for wire insulation particularly where the wire is to be subjected to high temperatures. It is useful as a protective coating for metal equipment, as a liner for piping and as a gasket material, especially where resistance to high temperatures and to attack by organic solvents is required. Pipe and tubing prepared by extrusion of the polymer have the same excellent properties of resistance to heat and chemical attack.

As many apparently widely different embodiments of this invention may be made without departing from the spirit and scope thereof, it is to be understood that we do not limit ourselves to the specific embodiments thereof except as defined in the appended claim.

We claim:

Solid polymerized tetramethylethylene oxide.

THEODORE L. CAIRNS.
ROBERT M. JOYCE, Jr.

REFERENCES CITED

The following references are of record in the file of this patent:

UNITED STATES PATENTS

| Number | Name | Date |
|---|---|---|
| 2,187,006 | Alvarado et al. | Jan. 16, 1940 |
| 2,280,722 | Schneider et al. | Apr. 21, 1942 |